US006941456B2

(12) United States Patent
Wilson

(10) Patent No.: US 6,941,456 B2
(45) Date of Patent: Sep. 6, 2005

(54) METHOD, SYSTEM, AND PROGRAM FOR ENCRYPTING FILES IN A COMPUTER SYSTEM

(75) Inventor: Rodger P. Wilson, Superior, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 897 days.

(21) Appl. No.: 09/847,555

(22) Filed: May 2, 2001

(65) Prior Publication Data

US 2002/0166053 A1 Nov. 7, 2002

(51) Int. Cl.[7] .................................................. G06F 9/00
(52) U.S. Cl. ........................ 713/160; 713/201; 380/825
(58) Field of Search ................................ 713/201, 202, 713/360; 380/258, 825

(56) References Cited

U.S. PATENT DOCUMENTS

| | | | | | |
|---|---|---|---|---|---|
| 5,109,413 | A | * | 4/1992 | Comerford et al. ............ | 705/54 |
| 5,293,424 | A | * | 3/1994 | Holtey et al. ................ | 713/193 |
| 5,388,157 | A | * | 2/1995 | Austin ......................... | 713/191 |
| 5,412,721 | A | * | 5/1995 | Rager et al. ................. | 380/273 |
| 5,552,776 | A | * | 9/1996 | Wade et al. ................ | 340/5.74 |
| 5,954,817 | A | * | 9/1999 | Janssen et al. .............. | 713/200 |
| 6,061,794 | A | * | 5/2000 | Angelo et al. .............. | 713/200 |
| 6,694,430 | B1 | * | 2/2004 | Zegelin et al. .............. | 713/160 |

FOREIGN PATENT DOCUMENTS

| | | | | |
|---|---|---|---|---|
| GB | 2276965 A | * | 12/1994 | ........... G06F/12/14 |

OTHER PUBLICATIONS

Microsoft Corp., "Encrypting File System for Windows 2000," pp. 1–28. Copyright 1998 Microsoft Corp.

Engelfriet, A. "Security: Filing Wiping". [online] [Retrieved on Mar. 24, 2001]. Retrieved from: http://www.stack.nl/~galactus/remailers/index–wipe.html.

New Technologies, Inc. "Sensitive Data Identification and Elimination Guidelines". [online] [Retrieved Mar. 24, 2001]. Retrieved from http://www.forensics–intl.com.

Thompson, S. "Windows 95 and the Swap File Controversy: A Lazy Man's Dream". [online] [Retrieved Mar. 24, 2001]. Retrieved from http://www.aserve.net/faq/win_95_swap.html.

Adams, L. "Security software . . . " [online] [Retrieved Mar. 24, 2001]. Can be currently found at http://www.light1998.com/CounterSpy/fs010.html.

New Technologies, Inc. "Windows Swap File Defined" [online] [Retrieved on Mar. 24, 2001]. Retrieved from http://www.forensics–intl.com/def7.html.

ZD, Inc. "Swap File Overwriter". [online] [Retrieved on Mar. 24, 2001]. Retrieved from www.zdnet.com.

Mauro, J. "Swap Space Implementation, part one". [online] [Retrieved on Mar. 24, 2001]. Retrieved from http://www.unixinsider.com/swol–12–1997/swol–12–insidesolaris.html.

Mauro, J. "Swap Space Implementation, part one". [online] [Retrieved on Mar. 24, 2001]. Retrieved from http://www.unixinsider.com/swol–01–1998/swol–01–insidesolaris.html.

"Wiping Swap Files". [online] [Retrieved Mar. 24, 2001] Retrieved from http://security.tao.ca/wipeswap.shtml.

* cited by examiner

Primary Examiner—Norman M. Wright
(74) Attorney, Agent, or Firm—Park, Vaughan & Fleming, LLP

(57) ABSTRACT

Provided is a method, system, and program for encrypting files in a computer in communication with a volatile memory and non-volatile storage device. An encryption code is generated to encrypt a file and a decryption code is generated to decrypt one file encrypted with the encryption code. The decryption code is loaded into the volatile memory, wherein the decryption code is erased from the volatile memory when the computer reboots. Files written to the non-volatile storage device are encrypted using the encryption code and the decryption code in the non-volatile memory is used to decrypt files encrypted with the encryption code to transfer from the non-volatile storage device to the volatile memory.

42 Claims, 7 Drawing Sheets

File Metadata

User Information Entry

Group Information Entry

Private Key Index

Public Key Index

METHOD, SYSTEM, AND PROGRAM FOR ENCRYPTING FILES IN A COMPUTER SYSTEM

BACKGROUND OF THE INVENTION

1. Field of the Invention

The present invention relates to a method, system, and program for encrypting files in a computer system.

2. Description of the Related Art

Many operating systems, such as the Microsoft Corporation Windows 95/98/2000/NT operating systems and Unix based operating systems (e.g., the Sun Microsystems, Inc. Solaris Operating system), utilize swap files.** The operating system uses a volatile memory, such as a random access memory (RAM), to store data being processed. When the utilization of the volatile memory reaches a certain threshold, data from the RAM is swapped to a hard disk drive as part of a virtual memory addressing system. The data swapped to hard disk drive storage has a virtual address in memory, such that if a program or process attempts to access that virtual address in memory, the data is then swapped back into memory from the swap file on the hard disk drive. The use of swap files makes the hard disk drive storage space available as additional virtual memory to supplement the volatile memory device, which is typically of a limited size and substantially more expensive than the non-volatile hard disk drive space.

A swap file can range in size from 20 million bytes to over 200 million bytes and the potential exists for these huge files to contain remnants of word processing files, E-Mail messages, Internet browsing activity, database entries and almost any other data that may have been generated during past work sessions. Swap files pose a significant security threat because the data remains transparently stored within the swap file without the knowledge of the computer user. This can occur even if the work product was stored on a computer network server. In fact, computer forensics specialists and law enforcement agencies are able to reconstruct user activity by parsing and analyzing the swap files with forensic software tools known in the art.

Moreover, some programs are capable of parsing the swap file to identify fragments of word processing communications, E-mail communications, Internet chat room communications, Internet news group posts, encryption passwords, network passwords, network logons, database entries, credit card numbers, social security numbers and the first and last names of individuals that have been listed in communications involving the subject computer. Needless to say, having such information fall into the "wrong hands" could prove disastrous to an organization or individual.

Some programs have been developed that overwrite the swap file after a session completes or in response to a user hitting a panic button. Notwithstanding, such utilities may not protect the system in the event the system is accessed before the utility can be invoked to destroy the swap file.

For these reasons there is a need in the art for improved techniques for protecting information on a computer system against unauthorized access and analysis.

SUMMARY OF THE PREFERRED EMBODIMENTS

Provided is a method, system, and program for encrypting data in a computer in communication with a volatile memory and non-volatile storage device. Pages in the volatile memory to move to a swap file in the non-volatile storage device as part of a virtual addressing system are encrypted. The encrypted pages are then moved from the volatile memory to the swap file. The pages in the swap file are decrypted when moving the pages back into memory. The decrypted pages are then moved back into memory.

In further implementations codes are generated to use to encrypt and decrypt the pages. The codes may comprise a public/private key pair generated using a public key cryptography algorithm. One key of the pair is used to encrypt the pages moved to the swap file and the other key of the pair is used to decrypt the page when moving the page from the swap file to the volatile memory.

Still further, the codes may be permanently lost if the computer performs a boot operation.

Further provided is a method, system, and program for encrypting files in a computer file system in communication with a volatile memory and a non-volatile storage device. The files in the file system are associated with groups. For each group, provided is a group identifier, a list of user identifiers of users allowed to access files in the group, and a first encryption code. A second encryption code is received for one user identifier. An input/output (I/O) request from a requesting user identifier with respect to a target file is received, wherein one second encryption code has been received for the user identifier. A determination is made of the group associated with the target file and the first encryption code for the group. The determined first encryption code is used to encrypt the target file if the I/O request is a write operation to write the target file to the non-volatile storage device. A determination is made as to whether the requesting user identifier is in the list for the determined group. If the requesting user identifier is in the list, then the second encryption code for the user identifier is used to decrypt the target file if the I/O request is a read operation to read the target file from the non-volatile storage device.

Still further provided, is a method, system, and program for encrypting files in a computer in communication with a volatile memory and non-volatile storage device. An encryption code is generated to encrypt a file and a decryption code is generated to decrypt one file encrypted with the encryption code. The decryption code is loaded into the volatile memory, wherein the decryption code is erased from the volatile memory when the computer reboots. Files transferred from the volatile memory to the non-volatile storage device are encrypted using the encryption code and files transferred from the non-volatile storage device to the volatile memory are decrypted using the decryption code maintained in the volatile memory.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
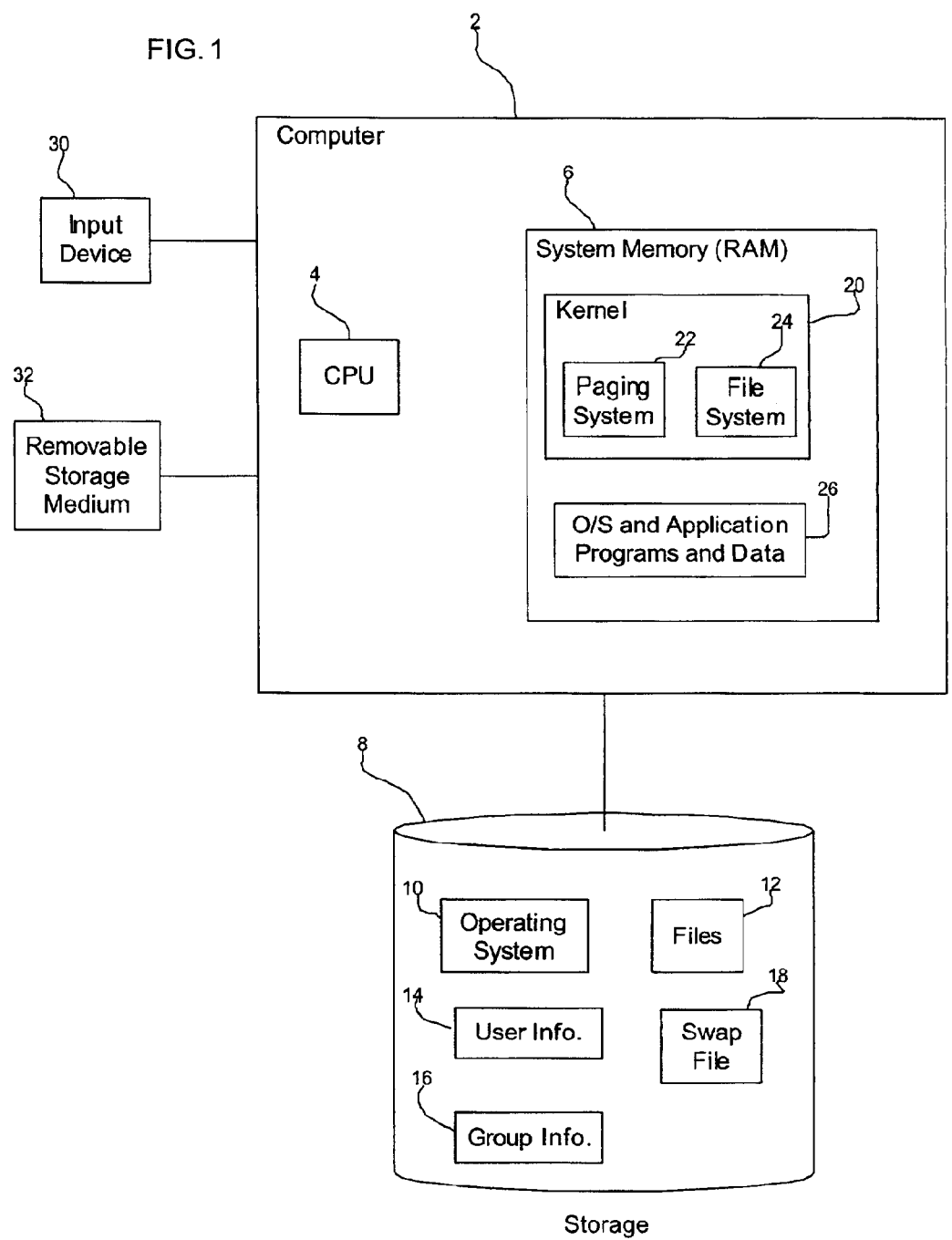
FIG. 1 is an illustration of a computing environment in which aspects of the invention are implemented.

FIG. 1 illustrates a computing environment implementation of the invention. A computer 2, which may comprise any computing device known in the art, including a desktop computer, mainframe, workstation, personal computer, hand held computer, palm computer, laptop computer, telephony device, network appliance, etc., includes a central processing unit (CPU) 4 and system memory 6, which is typically implemented as a volatile memory device, e.g., a random access memory (RAM), static random access memory (SRAM), dynamic random access memory (DRAM), etc. The computer 2 is capable of accessing a storage system 8, which may comprise one or more hard disk drives or any other non-volatile storage devices known in the art. The storage 8 includes an operating system 10, files 12, user information 14 providing individual user login information, group information 16 providing information for groups of users, and a swap file 18 used during virtual memory operations. The storage 8 may comprise a local storage space and/or a network storage space. For instance, the swap file 18 is typically located in local storage space, however, the operating system 10, files 12, user information 14, and group information 16 may be located on local and/or network storage space.

After initialization, the operating system 10 loads essential services and programs required by other parts of the operating system and applications into an area of the system memory 6 referred to as a kernel 20. The operating system 10 may comprise any operating system program known in the art, e.g., Solaris, Windows, etc. Typically, the kernel 20 is responsible for memory management, process and task management, and disk management. The kernel 20 further includes a paging system 22 and a file system 24. The paging system 22 implements a virtual memory system that is capable of swapping data between the memory 6 to the swap file 18 in local storage 8 in a manner known in the art to increase the available space of the system memory 6. The file system 24 comprises the operating system component that organizes and provides access to files in a manner known in the art, such as providing a hierarchical file system using directories to organize files into a tree structure. The system memory 6 farther includes additional operating system and application programs and data 26.

An input device 30 may comprise any user activated input means, such as a microphone, keyboard, mouse, pen stylus, etc., through which a user may enter data to the computer 2. The computer 2 is further capable of accessing data in a removable storage medium 32, such as a removable magnetic disk (e.g., floppy disk, ZIP disk, JAZ disk**), removable optical disk (e.g., CD-ROM, DVD, etc.), a Personal Computer Memory Card International Association (PCMCIA) card, removable flash card, etc., in a manner known in the art.

Figure 2:
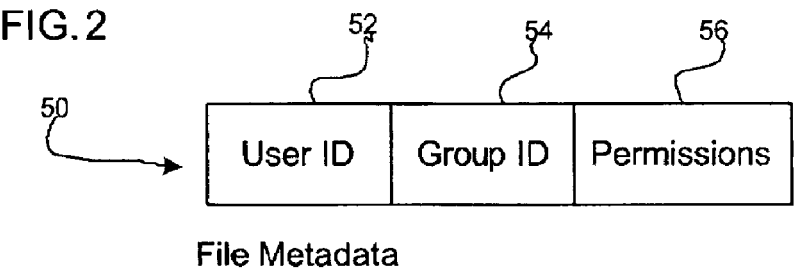
FIGS. 2, 3, 4, 6, and 7 illustrate data structures used in accordance with implementations of the invention.

The file system 24 would further maintain metadata for each file 12. For instance, in the Unix** operating system, the metadata file is referred to as an i-node or information node. FIG. 2 illustrates metadata 50 fields maintained for each file, including a user ID 52 indicating a unique identifier of the owner of the file, i.e., the user that is permitted to change the permissions for the file; a group ID 54 identifying a group of users that is permitted access to the file; and permissions 56 that indicate the level of access permitted to members of the group and the owner, such as read, write and/or execute.

Figure 3:
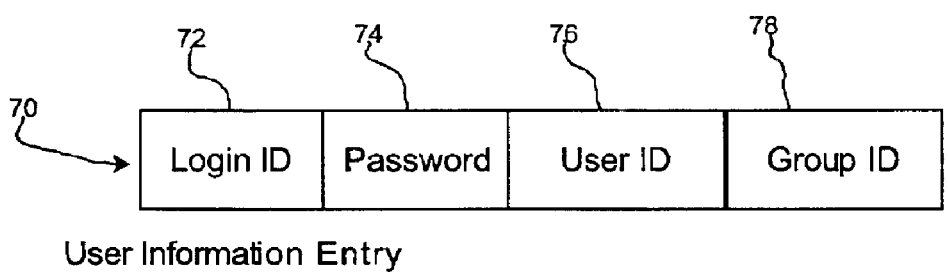

FIG. 3 illustrates the format of each entry 70 in the user information 14 that is used to authenticate a user login to the system. Such information would be maintained for each user in the system.

Login ID 72: this is the name provided in addition to the password, also known as the user name.

Password 74: encrypted password used to authenticate a login by a user.

User ID 76: unique numerical identifier for user in the system.

Group ID 78: numerical identifier of group of users to which user associated with login belongs.

Figure 4:
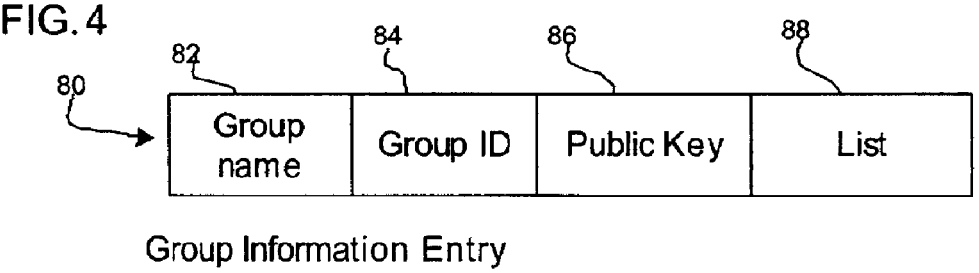

FIG. 4 illustrates each entry 80 in the group information 16 file that is maintained for each group of users identified in the system.

group name 82: name of the group.

group ID 84: numerical identifier of the group. Matches the group ID 76 maintained in the user information 14 file.

public key 86: public key assigned to the group having the group name 82 and group ID 84. Each user would be provided a private key that is capable of decrypting any files encrypted using the public key. (Alternatively, the group users may be provided the public key and the field 84 would maintain the private key). The public and private key pair may be generated using a public key cryptography algorithm known in the art, such as Diffie-Hellman encryption, etc.

list 88: list of all users IDs that are members of the group.

The above information is maintained by many network operating systems known in the art, such as Windows and Unix. In Unix, the user information 14 entries 70 are maintained in the etc/passwd file and the group information 16 entries 80 are maintained in the etc/group file.

The described implementations provide a technique for encrypting data in the files 12 and swap file 28 to prevent unauthorized access to such files. In certain implementations, the encryption programs are implemented in the paging system 22 and file system 24 to ensure encryption of any data written to storage 8, whether the paging system 22 is writing data to the swap file 18 or the file system 24 is writing data to files 12.

Figure 5:
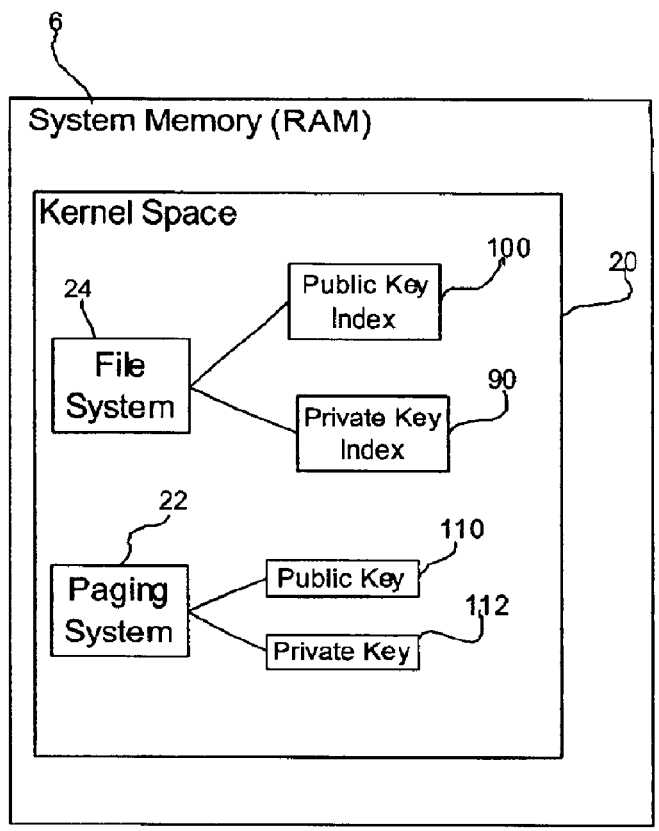
FIG. 5 illustrates further details of the system memory in accordance with implementations of the invention.
Figure 6:
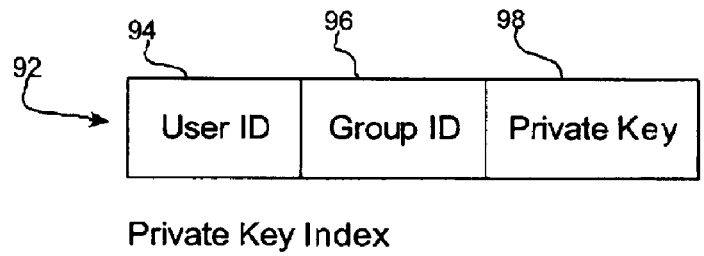

FIG. 5 illustrates further data structures the paging system 22 and file system 24 maintain in the kernel 20 to provide for encryption of the files 12 and swap files 18. To enable users who have properly logged onto the system to access files 12 associated with groups of which they are a member, the file system 24 maintains a private key index 90 in the kernel 20 of system memory 6 for the private keys users with active sessions have provided to decrypt files 12. FIG. 6 illustrates fields maintained for each entry 92 in the private key index 90, including a user ID 94 identifying the user that supplied the private key; the group ID 96 indicating the group for which the user supplied the private key; and the private key 98. In this way, the user maintains one or more group ID/private key pairs. The user may supply this group 1D/private key pair from a removable storage medium 32 or through the input device 30, e.g., manual or voice entry. Whenever a member of a group begins a session, the file system 24 adds an entry 92 into the private key index 90 based on the information the user supplied through the input device 30 or the removable storage medium 32. Whenever that group member that previously established a session requests an Input/Output (I/O) operation with respect to a file encrypted using the key included in the public key field 86 of the group information entry 80, the file system 24 would utilize the private 98 key the user provided for that group ID 96 to decrypt such file.

The file system 24 would generate the public and private key pairs for a group whenever a group is added to the file system 24. Any new users added to the group would be supplied the private key for the group. A group may include one or more users.

Figure 7:
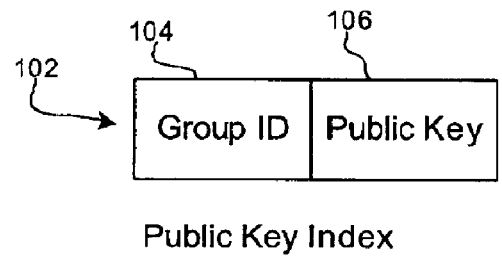

In certain implementations, the file system 24 may also maintain a public key index 100 (FIG. 5) in the kernel space 20 having one entry 102 shown in FIG. 7 for each active group, including the group ID 104 and public key 106 for such group. An entry 102 is added to the public key index 100 for a group when a member of the group establishes an active session in the system. In alternative implementations, the file system 20 may just access the public key information from the public key field 86 in the group information entry 80 for the group.

The paging system 22 maintains a public key 110 and private key 112 that is generated upon initialization. The paging system 22 would encrypt any data being written to the swap file 18 during virtual memory paging operations and decrypt pages m the swap file whenever the data at the virtual addressed is accessed from the storage 8 and placed in the memory 6 for access. For encryption, the paging system 22 would use one of the key pair 110 or 112 and for decryption the other of the key pair 110 or 112.

Figure 8:
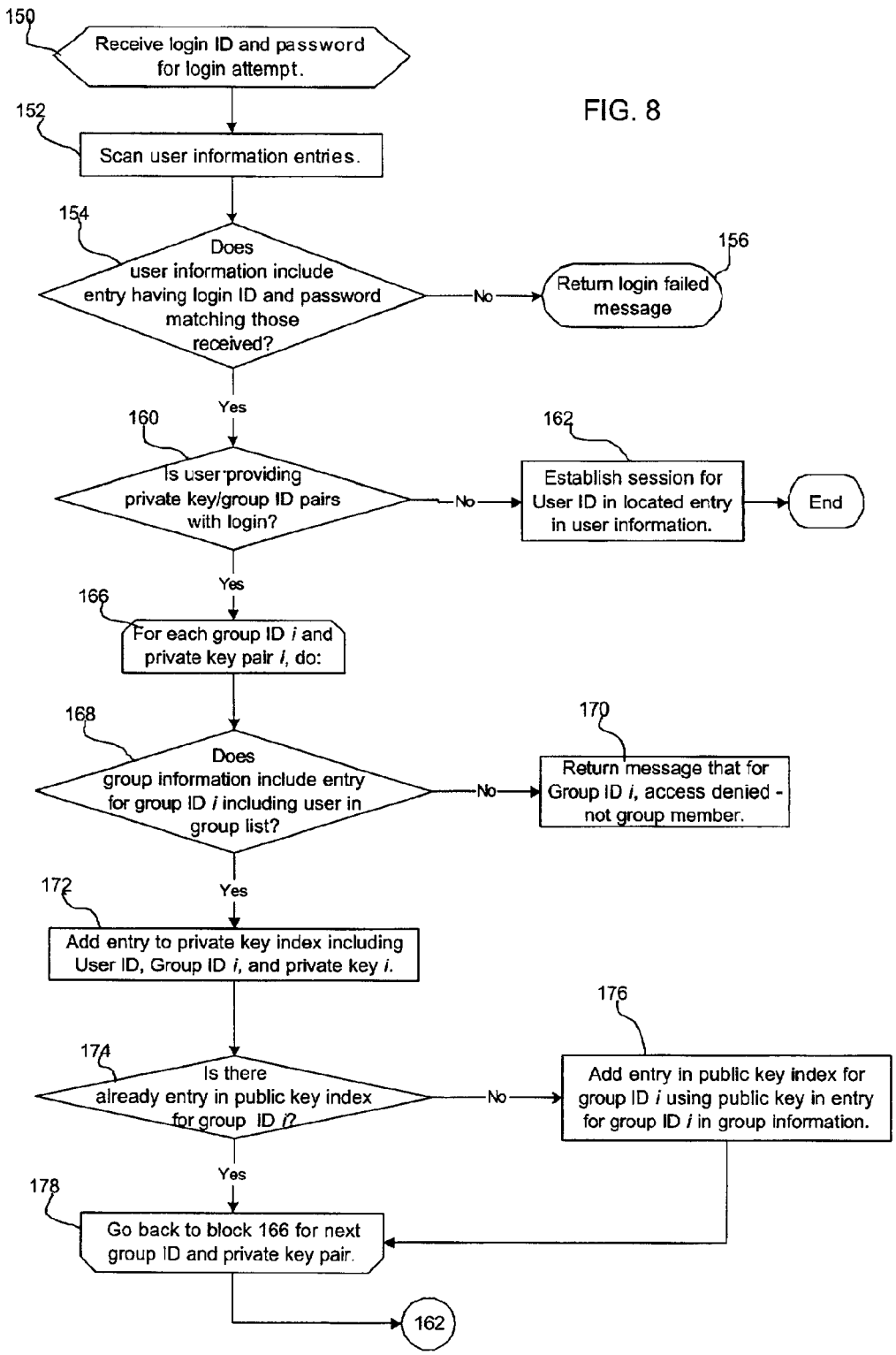
FIGS. 8, 9, and 10 illustrate logic implemented in a file system to encrypt and decrypt files in accordance with implementations of the invention.
Figure 9:
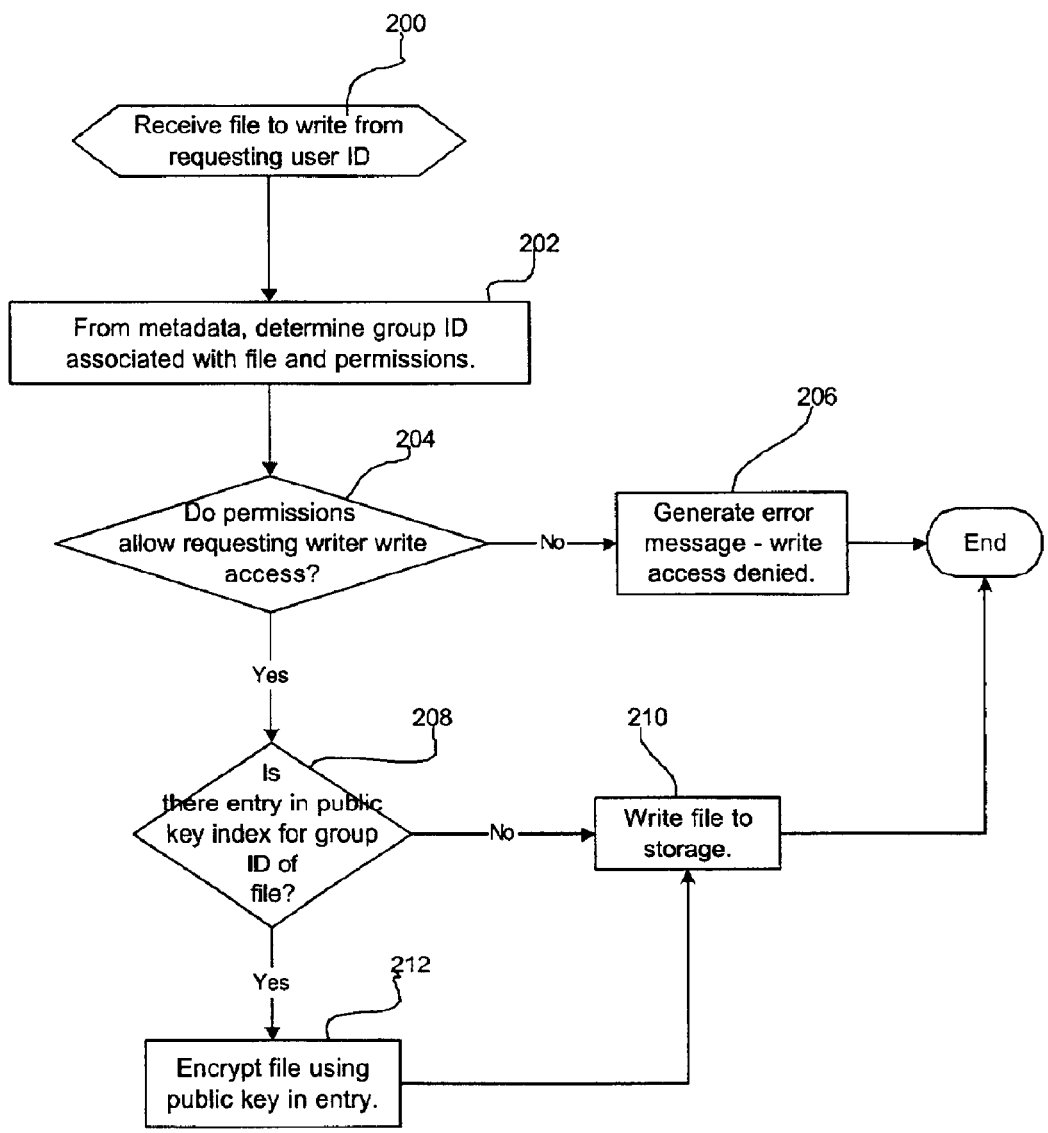
Figure 10:
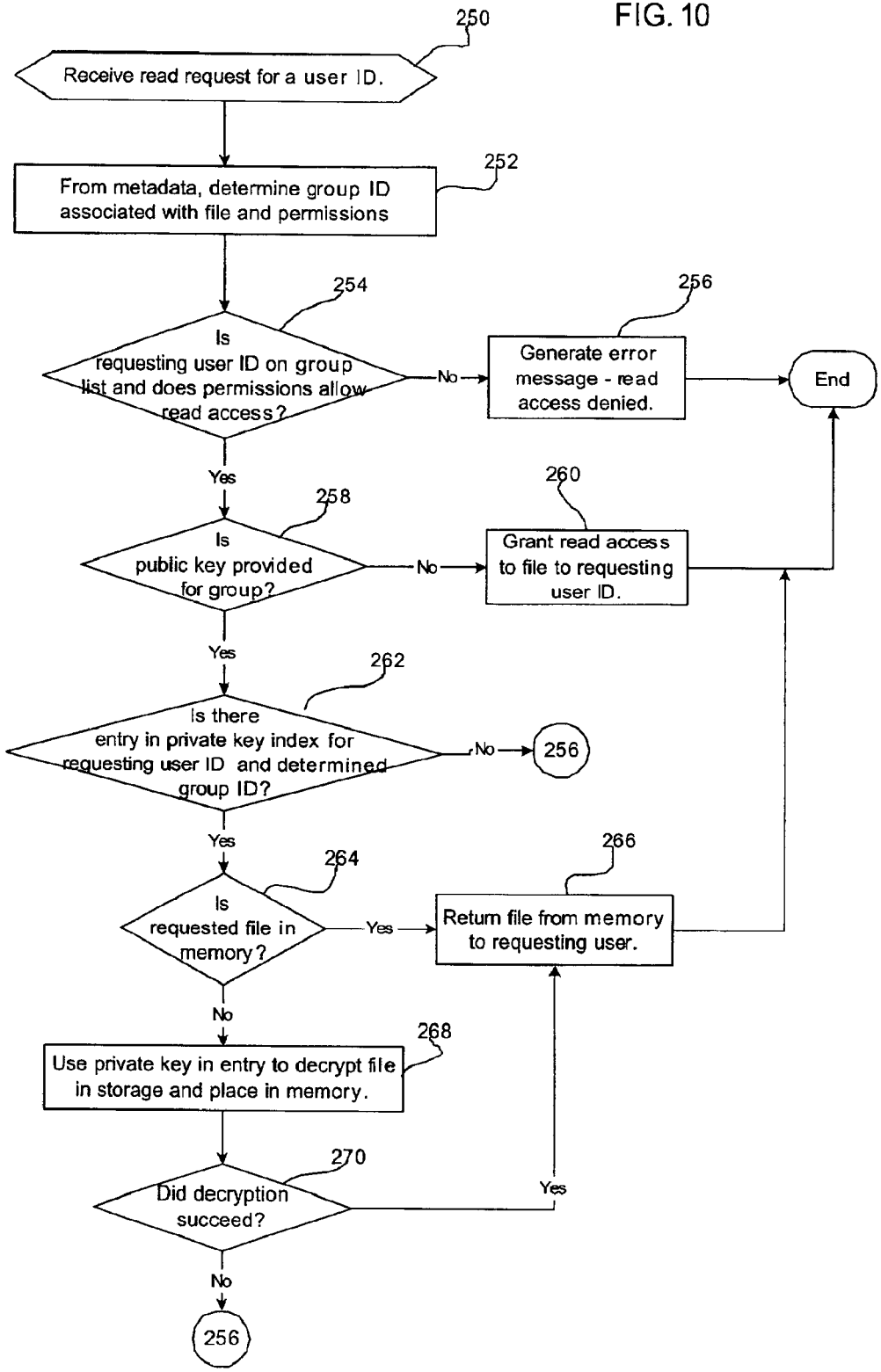

FIGS. 8, 9, and 10 illustrate logic implemented in the file system 24 to encrypt and decrypt the files 12 in accordance with implementations of the invention. FIG. 8 illustrates logic implemented in the file system 24 to authenticate a user that begins a session and load the encryption keys needed to provide that user access to files in the group to which the user belongs, such as any entries 92 and 102 in the private key 30 and public key 100 indexes. Control begins at block 150 with the file system 24 receiving a login ID and password for a login attempt. The file system 24 scans (at block 152) the user information 14 to determine (at block 154) whether the user information 14 includes an entry 70 having the received login ID and password values in the corresponding entries 72 and 74 (FIG. 3). If not, then the user attempting to login is not registered and a login failed message is returned (at block 156).

Otherwise, if the login is authenticated, then the file system 24 determines (at block 160) whether the user supplied any private key/group ID pairs with the login. As discussed, a user may provide the computer 2 private keys for different group IDs, i.e., group ID/private key pairs, through the input device 30 or on a removable storage medium 32. If the user is not providing any private keys for Group IDs with the login, then the session is established (at block 162) and the user is only allowed access to files associated with groups that do not provide for encryption. In certain implementations, certain type of files may be left unencrypted at all times. For instance, system configuration files should never be encrypted because they must be accessed in order to perform basic operations. If such configuration files are encrypted, then the operating system would not be able to initialize. To leave configuration files unencrypted, the permissions 56 in the file metadata 50 (FIG. 2) for the configuration files would be set to globally accessible. Similarly, an owner of a file may set a data file's permissions 56 to globally accessible to leave such files unencrypted for anyone to access and read.

If (at block 160) the user has supplied one or more private keys, then the file system 24 performs a loop at block 166 through 178 for each provided group ID/private key pair i. At block 168, the file system 24 determines whether the group information 16 includes an entry 80 (FIG. 4) having a group If) 84 matching the group ID i and that includes the user ID of the user in the list 88 of group members. If no such entry 80 is included in the group information 16, then a message is returned (at block 170) that access is denied for group ID i as the logged-in user is not listed as a member of the group having group ID i.

Otherwise, if there is an entry in the group information 16 for the group ID i listing the user on the member list 88, then the file system 24 adds (at block 172) an entry 92 to the private key index 90 (FIG. 5) including the user ID, group ID i, and private key i in fields 94, 96, and 98, respectively. If (at block 174) the public key index 100 does not include an entry for group ID i, then the file system 24 adds (at block 172) an entry 102 to the public key index 100 including the group ID i and public key 86 included in the group information entry 80 (FIG. 4) for group ID i in fields 104 and 106, respectively, to provide the file system 24 fast access to the public key 86 for group ID i in the kernel 20 If (at block 174) there already is an entry 102 for the group ID i in the public key index 100 or the entry 102 was added, then control proceeds (at block 178) back to block 166 to consider the next group ID/private key provided by the user. After all provided group ID/private key pairs have been considered, control proceeds to block 162 to complete the establishment of the session for the user performing the login operation.

With the logic of FIG. 8, once the session is established, the file system 24 has in the kernel 20 all the private and public keys for all the groups for which encryption is provided, or "encrypted groups", that active session users can access. The file system 24 may then use these private 90 and public 100 key indexes to encrypt and decrypt all files associated with the encrypted groups.

FIG. 9 illustrates logic implemented in the file system 24 to handle write requests. Control begins at block 200 with the file system 24 receiving a write request for a file from a requesting user ID. The file system 24 then accesses (at block 202) the metadata 50 (FIG. 2) for that file, and determines the group ID 54 for the file and the permissions 56 allowed to members of the group ID. If the permissions 56 do not allow the requesting user ID to write, i.e., members of the group ID, which includes the requesting user ID, do not have write access, then an error message is generated (at block 206) that write access is denied. Otherwise, if writing is permitted, then the file system 24 determines (at block 208) whether there is an entry 102 in the public key index 100 for the group ID determined from the metadata 50. (As discussed, the public key for a file may also be accessed directly from the public key field 86 in the group information entry 80 shown in FIG. 4.) If there is no public key provided for the determined group ID, then the file system 24 writes (at block 210) the file to storage 8 unencrypted. Otherwise, if a public key is provided (either in the public key index 100 or directly from the public key field 86 in the group information entry 80), then the file system 24 encrypts (at block 212) the file using the provided public key and then writes (at block 210) the encrypted file to storage 8.

The result of the logic of FIG. 9 is that for those group IDs using encryption, the file system 24 writes all files for that group ID encrypted to storage 8. In this way, if an unauthorized person obtains access to the storage 8, then such unauthorized person will not be able to access the content of the encrypted files unless the private key for such files can also be misappropriated. Moreover, in the event the computer 2 shuts down, then the private key index 92 will be erased from the system memory 6 because, in certain implementations, the private key index 92 is maintained in a non-swappable portion of memory 6, i.e., the kernel 20. FIG. 10 illustrates logic implemented in the file system 24 to read a file from the storage 8. Control begins at block 250 with the file system 24 receiving a read request from a requesting a user ID. In response, the file system 24 accesses the metadata 50 (FIG. 2) for the requested file to determine the associated group ID 54 and the permissions 56. If (at block 254) the requesting user ID is either not on the member list 88 (FIG. 4) for the group ID or read access is not permitted, then an error message is generated (at block 256). Otherwise, if the user ID is a member of the group, i.e., on the list 88, and read access is granted in the permissions 56 (FIG. 2), then a determination is made (at block 258) whether a public key is used with the group ID, i.e., the group is encrypted. If not, read access is granted (at block 260) to the requesting user ID as the requesting user ID is allowed access and no decryption is necessary as the file is not encrypted, i.e., not associated public key 86 in the group information entry 80 (FIG. 4).

If (at block 258) a public key is provided for the group ID, then the file system 24 determines (at block 262) whether there is an entry 92 in the private key index 90 (FIG. 5) for the requesting user ID 94 and the group ID 96 (FIG. 6). If (at block 258) no private key entry 92 is provided for the user ID and group ID in the private key index 90, then control proceeds to block 256 to end in read error. However, if (at block 262) there is a matching entry 92 in the private key index 90, then the file system 24 determines (at block 264) whether the requested file is in memory 6, i.e., a cache hit. The memory 6 may provide a cache for caching data used by applications. If so, the unencrypted file is returned (at block 266) from memory. Data in memory is unencrypted. If (at block 264) the requested file is not in memory 6, i.e., a cache miss, then the file system 24 uses (at block 268) the private key in the entry 92 in the private key index 90 for the determined group ID and requesting user ID to decrypt the file and store in memory 6. If (at block 270) the decryption did not succeed then control proceeds to block 256 to return an error; otherwise, if the decryption succeeds, then control proceeds to block 266 to return the decrypted file from memory 6.

With the logic of FIGS. 9 and 10, the file system 24 encrypts all data written to storage 8. This methodology prevents unauthorized users from accessing the data in storage 8. Further, when the computer 2 shuts down, the private key for the group ID provided by the authorized user will have been erased from the memory 6 and be inaccessible. Moreover, in implementations where the private keys are stored in the kernel space 20 there it is unlikely an unauthorized user can use current forensic techniques to extract the private key from the swap file 18 because the private key was loaded into a non-swappable portion of the memory 6. As mentioned, the kernel 20 is non-swappable. In such implementations, an unauthorized user would additionally have to misappropriate the private key from an authorized group user. Thus, obtaining the storage 8 is alone not sufficient to access the data in the files 12. Note that the above described advantages of FIGS. 8, 9, and 10 apply irregardless of whether the swap file 18 is encrypted because of the private key needed to decrypt the files.

Figure 11:
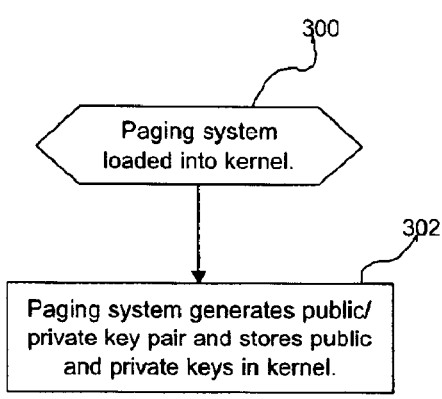
FIGS. 11, 12, and 13 illustrate logic implemented in a memory paging system to encrypt and decrypt files in accordance with implementations of the invention.
Figure 12:
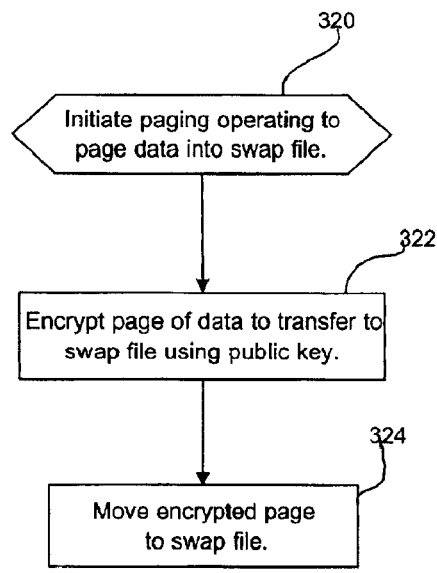
Figure 13:
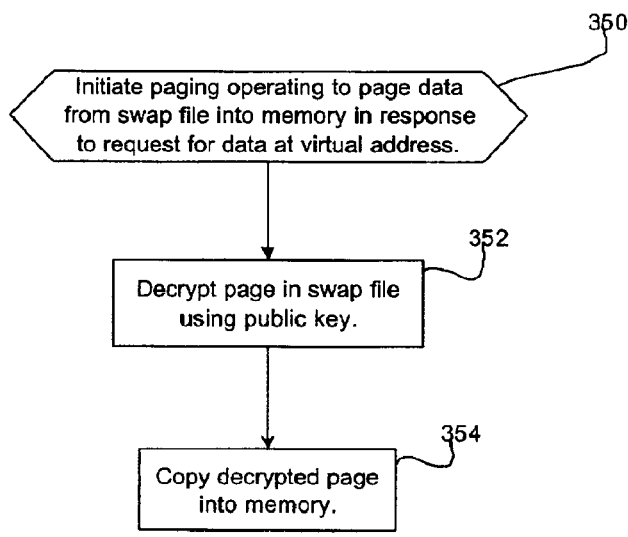

FIGS. 11, 12, and 13 illustrate logic implemented in the paging system 22 to encrypt the swap file 18 to prevent any unauthorized access to the swap file 18 in the storage 8. Such further encryption would prevent unauthorized users from accessing file 12 data paged into the swap file 12 during normal operations. FIG. 11 illustrates logic implemented in the paging system 22 during initialization. Control begins at block 300 when the operating system 10 initially loads the paging system 22 into the kernel 20. Once in the kernel 20, the paging system 22, or some other component of the operating system 10, generates (at block 302) a public 110/private 112 key pair (FIG. 5) using public key cryptography methods known in the art, and stores the generated public 110/private 112 key pair in the kernel 20, as shown in FIG. 5.

FIG. 12 illustrates logic the paging system 22 executes when writing memory pages into the swap file 18. Control begins at block 320 with the paging system 22 initiating a paging operation to move a memory page of data to the virtual memory area implemented in the swap file 18. The paging system 22 encrypts (at block 322) the page of data to transfer to the swap file 18 using either the public key 110 or the private key 112, and transfers (at block 324) the encrypted page to the swap file 18.

FIG. 13 illustrates logic in the paging system 22 to transfer a memory page from the swap file 12 to memory 6. Control begins at block 350 with the paging system 22 initiating a paging operation to transfer data from the swap file 18 to the memory 6, which may be invoked by a request to a virtual address in the memory 6. The paging system 22 then decrypts (at block 352) the page moved from the swap file 18 using the key 110 or 112 not used in the encryption operation. The decrypted page is then transferred (at block 354) to memory 6.

With the logic of FIGS. 11–13, once the computer 2 shuts down, the public 110/private 112 key pair in the kernel 20 is lost and the data in the swap file 18 cannot be accessed because the decryption key is lost. However, because the swap file 18 data is not needed between reboots of the computer 2, the fact that the encrypted swap file 18 from the previous initialization cannot be accessed is inconsequential to authorized users who can otherwise access the files 12. With the logic of FIGS. 11–13, unauthorized users are precluded from using software forensic tools known in the art to parse the swap file 18 to glean sensitive system information and data.

The described implementations utilize encryption techniques known in the art to encrypt both the files 12 and swap files 18 and prevent unauthorized users from accessing system data.

Additional Implementation Details

The technique for encrypting data described herein may be implemented as a method, apparatus or article of manufacture using standard programming and/or engineering techniques to produce software, firmware, hardware, or any combination thereof The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments of the configuration discovery tool are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the codes used to encrypt and decrypt the files comprised public/private key pairs generated using public cryptography algorithms known in the art. Additionally, alternative encryption and decryption techniques known in the art may be used.

In the described implementations, the user was provided the private key to use to decrypt the file and the public key was maintained with the group information for use in encrypting the files. Alternatively, the user may provide the public key to use to decrypt the file, and the file system may use the private key to encrypt the file.

In the described implementations, the key indexes were maintained in the kernel 20 or non-swappable region of memory 6. Alternatively, the key indexes may be maintained in swappable regions of the memory.

The program flow logic described in the flowcharts indicated certain events occurring in a certain order. Those skilled in the art will recognize that the ordering of certain programming steps or program flow may be modified without affecting the overall operation performed by the preferred embodiment logic, and such modifications are in accordance with the preferred embodiments.

The described implementations were discussed with respect to Windows and Unix based operating systems. However, the described implementations may apply to any operating system that provides file metadata and allows files in the system to be associated with different groups of users.

The foregoing description of the preferred embodiments of the invention has been presented for the purposes of illustration and description. It is not intended to be exhaustive or to limit the invention to the precise form disclosed Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

SOLARIS is a trademark of Sun Microsystems, Inc.; MICROSOFT and WINDOWS are trademarks of Microsoft Corporation; UNIX is a registered trademark of The Open Group; ZIP and JAZ are trademarks of the Iomega Corporation.

What is claimed is:

1. A method for encrypting data in a computer in communication with a volatile memory and non-volatile storage device, comprising:
   initiating a paging operation to move pages in the volatile memory to a swap file in the non-volatile storage device, wherein the non-volatile storage device is part of a virtual addressing system;
   generating codes to use to encrypt and decrypt the pages, wherein the codes are permanently lost if the computer performs a boot operation;
   encrypting the pages in the volatile memory;
   moving the encrypted pages from the volatile memory to the swap file; and
   upon receiving a subsequent request to transfer the encrypted pages from the swap file to the volatile memory,
      decrypting the encrypted pages in the swap file, and moving the decrypted pages back into the volatile memory.

2. The method of claim 1, wherein the codes comprise a public/private key pair generated using a public key cryptography algorithm, wherein one key of the pair is used to encrypt the pages moved to the swap file and the other key of the pair is used to decrypt the page when moving the page from the swap file to the volatile memory.

3. The method of claim 1, wherein the codes are loaded into a non-swappable region of the volatile memory that is not moved to the swap file.

4. A method for encrypting files in a computer file system in communication with a volatile memory and a non-volatile storage device, wherein files in the file system are associated with groups, comprising:
   providing, for each group, a group identifier, a list of user identifiers of users allowed to access files in the group, and a first encryption code;
   receiving a second encryption code for one user identifier;
   receiving an input/output (I/O) request from a requesting user identifier with respect to a target file, wherein one second encryption code has been received for the user identifier;
   determining the group associated with the target file and the first encryption code for the group;
   if the I/O request is a write operation, then using the determined first encryption code to encrypt the target file to write the target file to the non-volatile storage device; and
   if the I/O request is a read operation to read the target file from the non-volatile storage device, then performing:
      (i) determining whether the requesting user identifier is in the list for the determined group; and
      (ii) if the requesting user identifier is in the list, then using the second encryption code for the user identifier to decrypt the target file.

5. The method of claim 4, further comprising:
   for each group, generating a public and private encryption key pair using a public key encryption algorithm, wherein the first encryption code for the group is one of the generated public key or private key and the second encryption code is the other one of the public or private key generated for the group.

6. The method of claim 5, further comprising receiving a plurality of keys from the user, wherein each received key is used to decrypt files associated with one group identifier.

7. The method of claim 5, further comprising:
   generating an index entry in a non-swappable region in the volatile memory; and
   adding to the index entry the user identifier of the user that provided the key, the group identifier associated with the received key, and the received key.

8. The method of claim 7, wherein the index entry for the user identifier and group identifier is only generated if the user identifier is included in the list associated with the group identifier, and wherein the user identifier cannot perform a read access for the target file if there is no index entry for the group identifier associated with the target file and the user identifier.

9. The method of claim 7, wherein files read and decrypted from the non-volatile storage device are cached in the volatile memory, and wherein if the requested file is unencrypted in the cache, returning the unencrypted file from the cache to the requesting user identifier if the requesting user identifier is in the list associated with the group identifier and there is one index entry for the user identifier and group identifier in the volatile memory.

10. The method of claim 4, wherein the second encryption code is accessed from a removable storage medium.

11. A method for encrypting files in a computer in communication with a volatile memory and non-volatile storage device, comprising:
generating an encryption code to encrypt a file and a decryption code to decrypt one file encrypted with the encryption code;
loading the decryption code into the volatile memory, wherein the decryption code is erased from the volatile memory when the computer reboots;
encrypting files with the encryption code to transfer from the volatile memory to the non-volatile storage device; and
decrypting files with the decryption code maintained in the volatile memory to transfer from the non-volatile storage device to the volatile memory.

12. The method of claim 11, further comprising:
generating a new encryption and decryption codes when the computer reboots, wherein the new encryption code is used to transfer files from the volatile memory to the non-volatile storage device and wherein the new decryption code is used to transfer files from the nonvolatile storage device to the volatile memory as part of a read operation.

13. The method of claim 11, wherein the decryption code is loaded into a non-swappable region of the volatile memory.

14. The method of claim 11, wherein the files are transferred between the volatile memory and non-volatile storage as part of a virtual memory paging operation.

15. A system for encrypting data, comprising:
a volatile memory;
a non-volatile storage device, wherein data is capable of being transferred between the volatile memory and non-volatile storage device;
means for initiating a paging operation to move pages in the volatile memory to a swap file in the non-volatile storage device, wherein the non-volatile storage device is part of a virtual addressing system;
means for generating codes to use to encrypt and decrypt the pages, wherein the codes are permanently lost if the computer performs a boot operation;
means for encrypting the pages in the volatile memory;
means for moving the encrypted pages from the volatile memory to the swap file;
means for receiving a subsequent request to transfer the encrypted pages from the swan file to the volatile memory;
means for decrypting the encrypted pages in the swap file; and
means for moving the decrypted pages back into the volatile memory.

16. The system of claim 15, wherein the codes comprise a public/private key pair generated using a public key cryptography algorithm, wherein one key of the pair is used to encrypt the pages moved to the swap file and the other key of the pair is used to decrypt the page when moving the page from the swap file to the volatile memory.

17. The system of claim 15, further comprising:
means for loading the codes into a non-swappable region of the volatile memory that is not moved to the swap file.

18. A system for encrypting files, comprising:
a non-volatile storage device, wherein the non-volatile storage device includes a computer file system, wherein files in the file system are associated with groups;
means for providing, for each group, a group identifier, a list of user identifiers of users allowed to access files in the group, and a first encryption code;
means for receiving a second encryption code for one user identifier;
means for receiving an input/output (I/O) request from a requesting user identifier with respect to a target file, wherein one second encryption code has been received for the user identifier;
means for determining the group associated with the target file and the first encryption code for the group;
means for using the determined first encryption code to encrypt the target file to write the target file to the non-volatile storage device if the I/O request is a write operation; and
means for performing if the I/O request is a read operation to read the target file from the non-volatile storage device:
(i) determining whether the requesting user identifier is in the list for the determined group; and
(ii) if the requesting user identifier is in the list, then using the second encryption code for the user identifier to decrypt the target file.

19. The system of claim 18, further comprising:
means for generating, for each group, a public and private encryption key pair using a public key encryption algorithm, wherein the first encryption code for the group is one of the generated public key or private key and the second encryption code is the other one of the public or private key generated for the group.

20. The system of claim 19, further comprising:
means for receiving a plurality of keys from the user, wherein each received key is used to decrypt files associated with one group identifier.

21. The system of claim 19, further comprising:
means for generating an index entry in a non-swappable region in the volatile memory; and
means for adding to the index entry the user identifier of the user that provided the key, the group identifier associated with the received key, and the received key.

22. The system of claim 21, wherein the index entry for the user identifier and group identifier is only generated if the user identifier is included in the list associated with the group identifier, and wherein the user identifier cannot perform a read access for the target file if there is no index entry for the group identifier associated with the target file and the user identifier.

23. The system of claim 21, wherein files read and decrypted from the non-volatile storage device are cached in the volatile memory, further comprising:
returning the unencrypted file from the cache to the requesting user identifier if the requested file is unencrypted in the cache and if the requesting user identifier is in the list associated with the group identifier and if there is one index entry for the user identifier and group identifier in the volatile memory.

24. The system of claim 18, wherein the second encryption code is accessed from a removable storage medium.

25. A system for encrypting files, comprising:
a volatile memory;
a non-volatile storage device, wherein data is capable of being transferred between the volatile memory and non-volatile storage device;
means for generating an encryption code to encrypt a file and a decryption code to decrypt one file encrypted with the encryption code;
means for loading the decryption code into the volatile memory, wherein the decryption code is erased from the volatile memory when the computer reboots;
means for encrypting files with the encryption code to transfer from the volatile memory to the non-volatile storage device; and
means for decrypting files with the decryption code maintained in the volatile memory to transfer from the non-volatile storage device to the volatile memory.

26. The system of claim 25, further comprising:
means for generating a new encryption and decryption codes when the computer reboots, wherein the new encryption code is used to transfer files from the volatile memory to the non-volatile storage device and wherein the new decryption code is used to transfer files from the non-volatile storage device to the volatile memory as part of a read operation.

27. The system of claim 25, wherein the decryption code is loaded into a non-swappable region of the volatile memory.

28. The system of claim 25, wherein the files are transferred between the volatile memory and non-volatile storage as part of a virtual memory paging operation.

29. An article of manufacture including program logic for encrypting data in a computer in communication with a volatile memory and non-volatile storage device, by:
initiating a paging operation to move pages in the volatile memory to a swap file in the non-volatile storage device, wherein the non-volatile storage devise is part of a virtual addressing system;
generating codes to use to encrypt and decrypt the pages, wherein the codes are permanently lost if the computer performs a boot operation;
encrypting the pages in the volatile memory;
moving the encrypted pages from the volatile memory to the swap file; and
upon receiving a subsequent request to transfer the encrypted pages from the swap file to the volatile memory,
decrypting the encrypted pages in the swap file; and
moving the decrypted pages back into the volatile memory.

30. The article of manufacture of claim 29, wherein the codes comprise a public/private key pair generated using a public key cryptography algorithm, wherein one key of the pair is used to encrypt the pages moved to the swap file and the other key of the pair is used to decrypt the page when moving the page from the swap file to the volatile memory.

31. The article of manufacture of claim 29, wherein the codes are loaded into a non-swappable region of the volatile memory that is not moved to the swap file.

32. An article of manufacture including program logic for encrypting files in a computer file system in communication with a volatile memory and a non-volatile storage device, wherein files in the file system are associated with groups by:

providing, for each group, a group identifier, a list of user identifiers of users allowed to access files in the group, and a first encryption code;
receiving a second encryption code for one user identifier,
receiving an input/output (I/O) request from a requesting user identifier with respect to a target file, wherein one second encryption code has been received for the user identifier;
determining the group associated with the target file and the first encryption code for the group;
if the I/O request is a write operation, then using the determined first encryption code to encrypt the target file to write the target file to the non-volatile storage device; and
if the I/O request is a read operation to read the target file from the non-volatile storage device, then performing:
(i) determining whether the requesting user identifier is in the list for the determined group; and
(ii) if the requesting user identifier is in the list, then using the second encryption code for the user identifier to decrypt the target file.

33. The article of manufacture of claim 32, further comprising:
for each group, generating a public and private encryption key pair using a public key encryption algorithm, wherein the first encryption code for the group is one of the generated public key or private key and the second encryption code is the other one of the public or private key generated for the group.

34. The article of manufacture of claim 33, further comprising receiving a plurality of keys from the user, wherein each received key is used to decrypt files associated with one group identifier.

35. The article of manufacture of claim 33, further comprising:
generating an index entry in a non-swappable region in the volatile memory; and
adding to the index entry the user identifier of the user that provided the key, the group identifier associated with the received key, and the received key.

36. The article of manufacture of claim 35, wherein the index entry for the user identifier and group identifier is only generated if the user identifier is included in the list associated with the group identifier, and wherein the user identifier cannot perform a read access for the target file if there is no index entry for the group identifier associated with the target file and the user identifier.

37. The article of manufacture of claim 35, wherein files read and decrypted from the non-volatile storage device are cached in the volatile memory, and wherein if the requested file is unencrypted in the cache, returning the unencrypted file from the cache to the requesting user identifier if the requesting user identifier is in the list associated with the group identifier and there is one index entry for the user identifier and group identifier in the volatile memory.

38. The article of manufacture of claim 32, wherein the second encryption code is accessed from a removable storage medium.

39. An article of manufacture including program logic for encrypting files in a computer in communication with a volatile memory and non-volatile storage device by:
generating an encryption code to encrypt a file and a decryption code to decrypt one file encrypted with the encryption code;
loading the decryption code into the volatile memory, wherein the decryption code is erased from the volatile memory when the computer reboots;

encrypting files with the encryption code to transfer from the volatile memory to the non-volatile storage device; and decrypting files with the decryption code maintained in the volatile memory to transfer from the non-volatile storage device to the volatile memory.

40. The article of manufacture of claim 39, further comprising:

generating a new encryption and decryption codes when the computer reboots, wherein the new encryption code is used to transfer files from the volatile memory to the non-volatile storage device and wherein the new decryption code is used to transfer files from the non-volatile storage device to the volatile memory as part of a read operation.

41. The article of manufacture of claim 39, wherein the decryption code is loaded into a non-swappable region of the volatile memory.

42. The article of manufacture of claim 39, wherein the files are transferred between the volatile memory and non-volatile storage as part of a virtual memory paging operation.

* * * * *

UNITED STATES PATENT AND TRADEMARK OFFICE
CERTIFICATE OF CORRECTION

PATENT NO. : 6,941,456 B2
DATED : September 6, 2005
INVENTOR(S) : Rodger P. Wilson It is certified that error appears in the above-identified patent and that said Letters Patent is hereby corrected as shown below:

Column 11,
Line 58, please delete the word "swan" and replace with the word -- swap --.

Column 13,
Line 40, please delete the word "devise" and replace with the word -- device --.

Signed and Sealed this

Eighth Day of November, 2005

JON W. DUDAS
*Director of the United States Patent and Trademark Office*